United States Patent [19]

Fencl

[11] 4,185,165
[45] Jan. 22, 1980

[54] LOW NOISE SYSTEM AND METHOD FOR SEQUENTIALLY SENSING INDUCED SIGNALS IN DIGITIZER GRID CONDUCTORS

[75] Inventor: George A. Fencl, Phoenix, Ariz.

[73] Assignee: Talos Systems, Inc., Scottsdale, Ariz.

[21] Appl. No.: 921,514

[22] Filed: Jul. 3, 1978

[51] Int. Cl.² ............................................. G08C 21/00
[52] U.S. Cl. ..................................................... 178/19
[58] Field of Search ................................. 178/18,19,20; 340/146.3 SY, 347 AD; 33/1 M

[56] References Cited

U.S. PATENT DOCUMENTS

| | | | |
|---|---|---|---|
| 3,735,044 | 5/1973 | Centner et al. | 178/19 |
| 3,767,858 | 10/1973 | Rodgers | 178/18 |
| 3,851,097 | 11/1974 | Rodgers | 178/19 |
| 3,886,311 | 5/1975 | Rodgers et al. | 178/18 |
| 3,904,822 | 9/1975 | Kamm et al. | 178/19 |
| 3,983,322 | 9/1976 | Rodgers | 178/19 |
| 4,022,971 | 5/1977 | Rodgers | 178/19 |
| 4,054,746 | 10/1977 | Kamm | 178/19 |
| 4,088,842 | 5/1978 | Ikedo | 178/19 |

Primary Examiner—Thomas A. Robinson
Attorney, Agent, or Firm—Cahill, Sutton, & Thomas

[57] ABSTRACT

A low noise system and method are provided for sequentially sensing induced signals in a plurality of digitizer grid conductors. The digitizer includes a coil disposed above the tip of a pen. The coil induces the signals in the grid conductors. The system includes scanning circuitry which sequentially scans the grid conductors, which are oriented in an X direction and a Y direction, causing the induced signal to be sequentially coupled to the input of a differential amplifier. The X and Y grid conductors each have first ends connected to corresponding inputs of first and second multiplexers. The X and Y grid conductors each also have corresponding second ends connected to first and second corresponding common conductors. The outputs of the first and second multiplexers are coupled, respectively, to first and second inputs of the differential amplifier. The first and second common conductors are coupled, respectively, to the outputs of the second and first multiplexers. In one embodiment of the invention, each group of grid conductors is divided into subgroups of conductors each having their first ends respectively connected to corresponding inputs of a first multiplexer. The second ends of the conductors of each subgroup are coupled to a common conductor by isolation diodes having their anodes connected to that corresponding common conductor. The respective common conductors are connected to corresponding inputs of a second multiplexer having its output connected to the second input of the differential amplifier.

7 Claims, 11 Drawing Figures

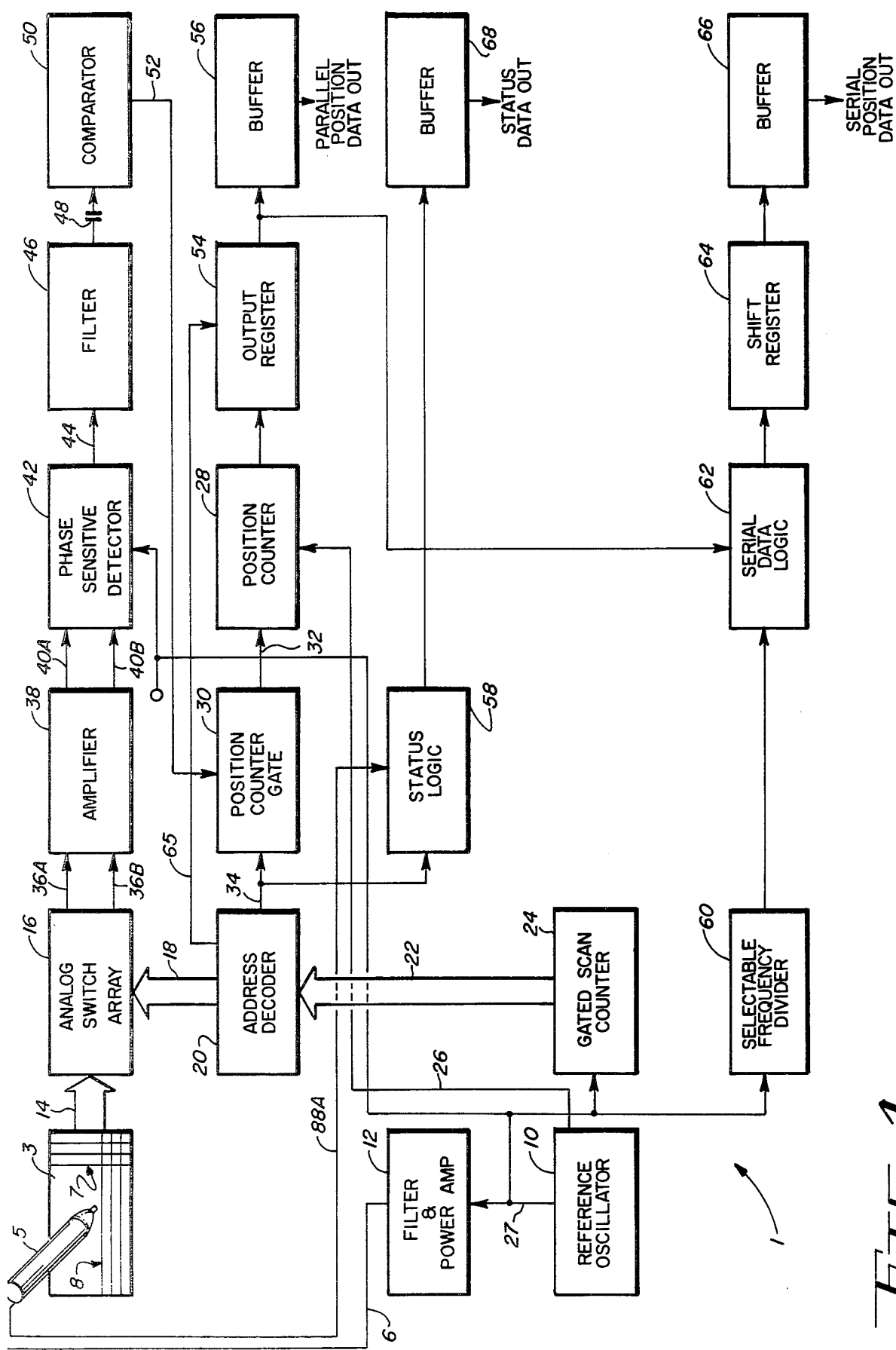

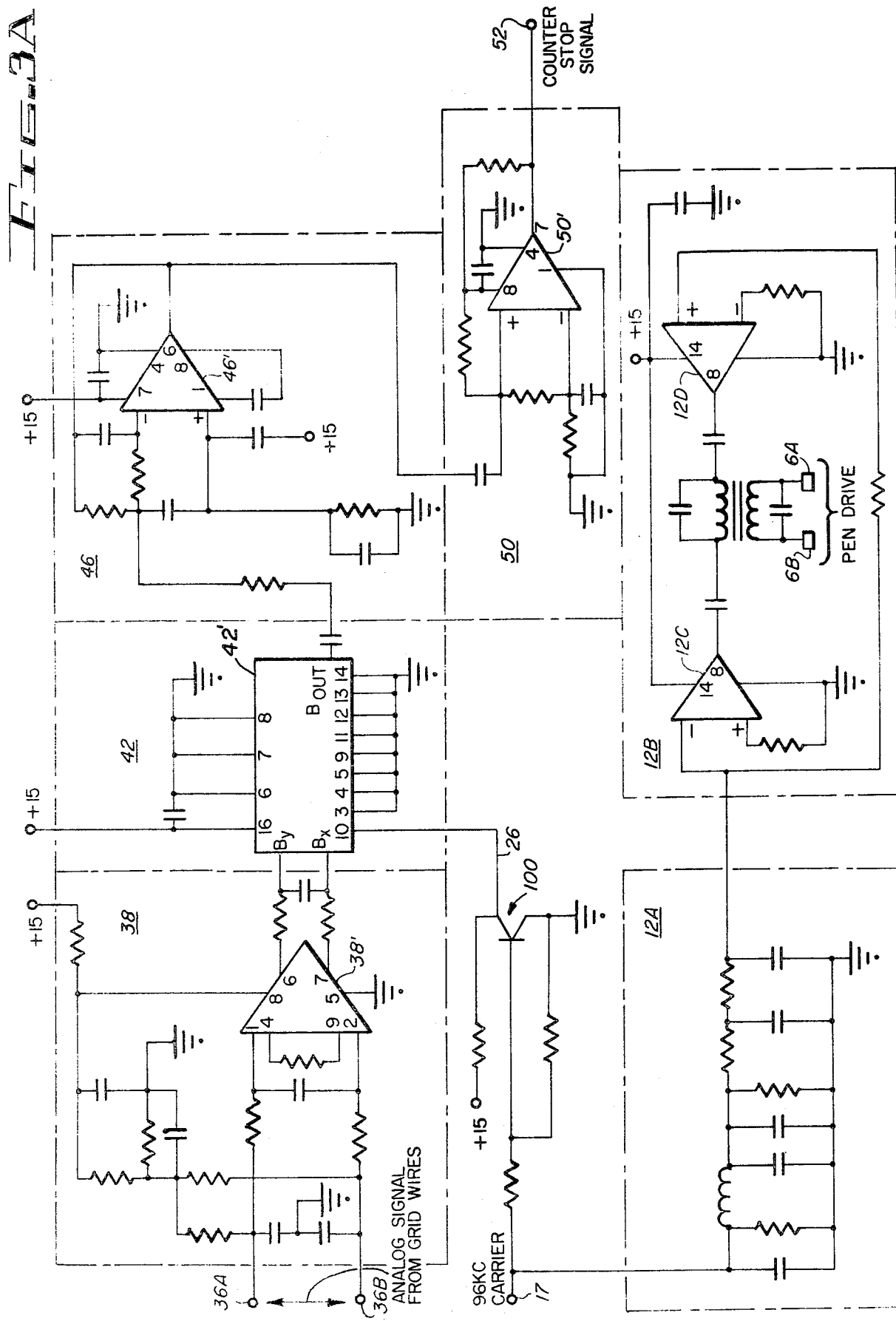

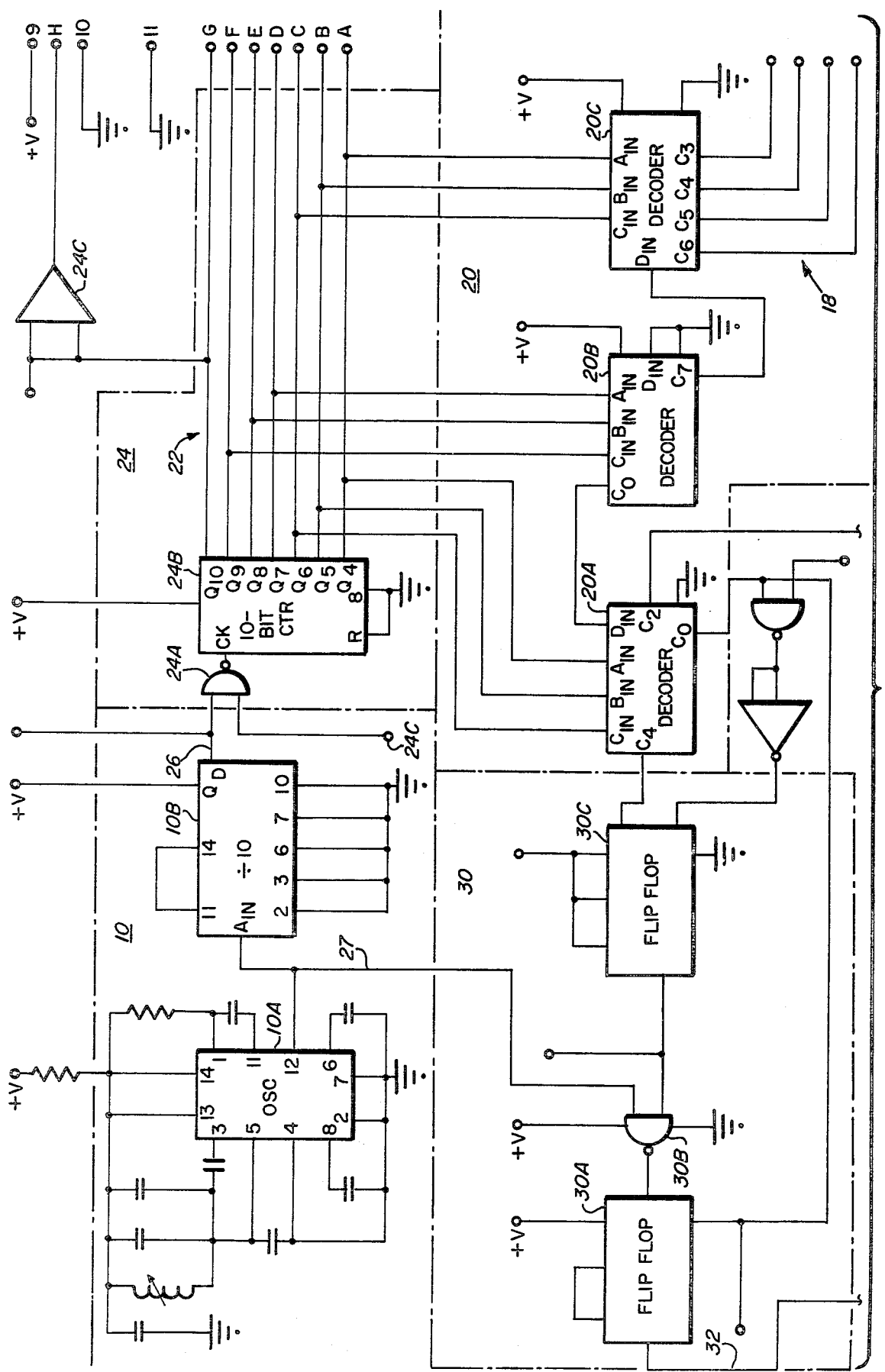

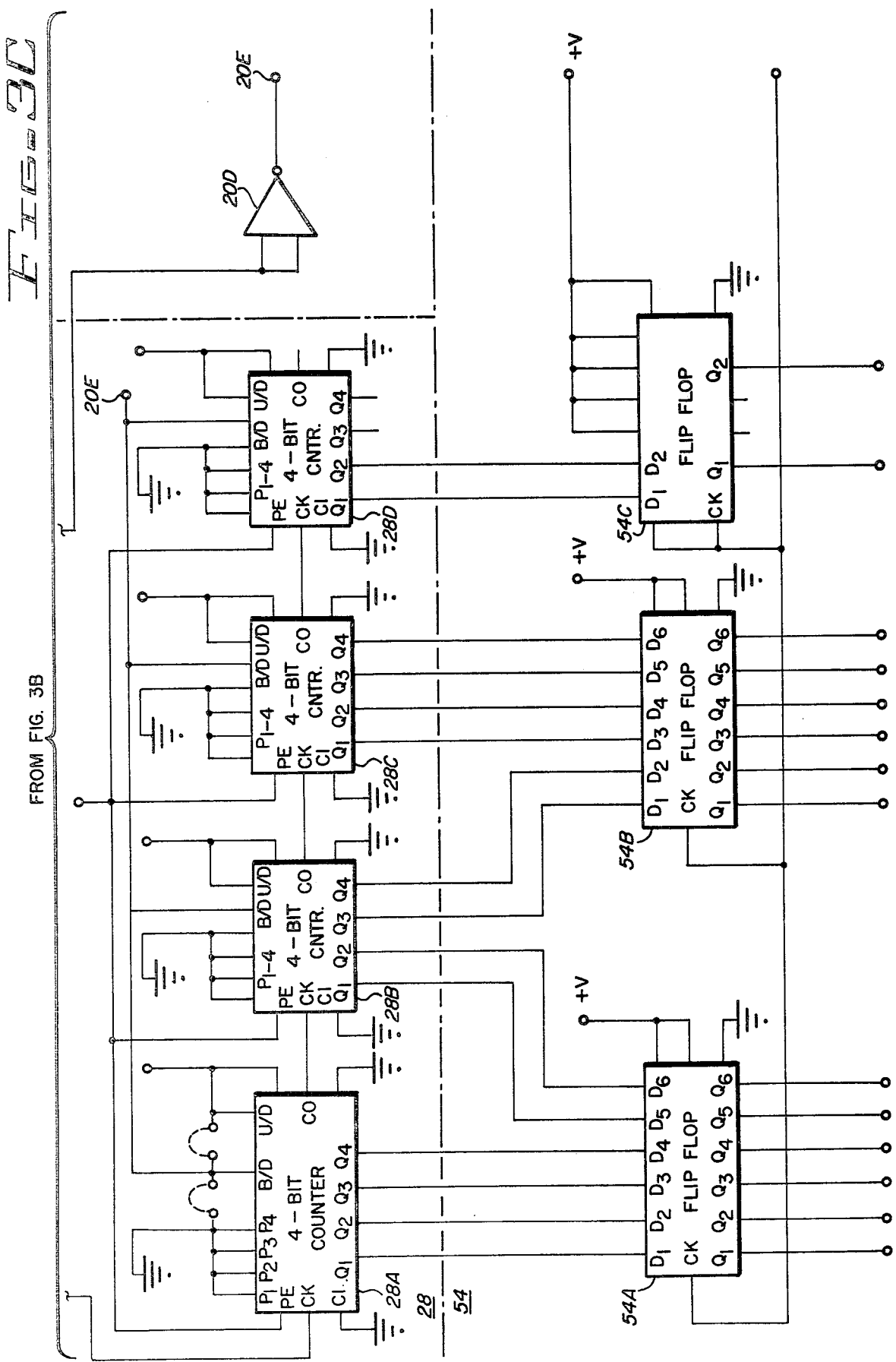

LOW NOISE SYSTEM AND METHOD FOR SEQUENTIALLY SENSING INDUCED SIGNALS IN DIGITIZER GRID CONDUCTORS

This application is closely related to co-pending patent application Ser. No. 921,572 entitled "METHOD AND APPARATUS FOR DIGITIZING THE LOCATION OF AN INSTRUMENT RELATIVE TO A GRID" by Rodgers et al., filed on even data herewith and assigned to the present assignee.

BACKGROUND OF THE INVENTION

1. Field of the Invention

The invention relates to methods and apparatus for digitizing a position of an instrument with respect to a grid of spaced conductors, and more particularly to low noise methods and apparatus for sequentially sensing induced signals in grid conductors of a digitizer.

2. Description of the Prior Art

Various high resolution apparatus for translating a position of a movable instrument, such as a pointer or pen, into electrical signals for transmission to a local or remote utilization device are well known in the art. Corresponding movements of the pointer or pen thus can be re-created at another location. Such apparatus, commonly referred to as digitizers, can also be utilized as data entry systems for computers. The known digitizing devices generally include a rigid support structure suitable for supporting a work sheet such as a graph, chart or piece of industrial artwork to be digitized. A grid or matrix of conductors is ordinarily imbedded immediately beneath the support surface. The moveable instrument is generally positioned over and pressed against the work sheet and is moved to trace various patterns or identify various coordinates on the work sheet. One known type of digitizer energizes the imbedded conductors, which are arranged as perpendicular groups of X and Y conductors forming a rectangular coordinate system, by means of a phase locked loop system. A voltage controlled oscillator drives a circuit which produces a predetermined phase change uniformly distributed between a group of parallel conductors in the grid or matrix by means of a precision resistive divider network. The pointer or pen operates as an antenna which electrostatically senses the composite electrical field at the location of the pointer or pen tip and feeds sense signals back to a phase detector of the phase locked loop system. The phase detector causes the oscillator frequency to be increased to seek a zero phase shift condition. The oscillator frequency therefore represents the location of the pointer or pen tip with respect to the group of spaced parallel conductors. The state of the art for this type of digitizer is indicated by U.S. Pat. Nos. 3,767,858; 3,851,097; 3,983,322; 3,886,311; and 4,022,971, all assigned to the present assignee. Although precision digitizers have been successfully implemented and marketed using the techniques described in the above patents, such digitizers are very complex and expensive, and further require a considerable amount of adjustment and maintenance. They are therefore unsuitable for many applications wherein a much less expensive and complex digitizer would be highly desirable. The above described type of digitizer further has the shortcoming that its accuracy is adversely affected by conductive marks or areas on the worksheets utilized.

Another known type of digitizer utilizes a coil located around the pointer or pen tip. The grid conductors imbedded in the support surface are sequentially energized with signals of a fixed predetermined amplitude and frequency for one of the X and Y groups of conductors. The voltage induced in the coil is inputted to circuitry which detects a polarity reversal of the signal induced in the coil as conductors on opposite sides of the pen are sequentially energized, in accordance with electromagnetic theory. The phase reversal detecting circuitry produces a pulse which is utilized to sample a position counter which counts at a predetermined rate during the scanning procedure. The sampled contents of the position counter represent the position of the pointer or pen tip for the X or Y coordinate being scanned. The state of the art for this type of digitizer is set forth in U.S. Pat. Nos. 3,735,044; 3,904,822; and 4,054,746. Although this type of digitizing system does not require the precision resistor arrays of the previously described digitizing system, it has a relatively low signal to noise ratio, and requires expensive high gain precision amplifier and phase shift circuitry for detecting the very low magnitude low energy signal induced in the pen tip coil. The foregoing type of digitizing system requires power transistors coupled to each grid conductor in order to drive a sufficiently large current pulse down each grid conductor to induce a suitably large signal in the coil supported by the pen tip. This results in an undue amount of noise in the form of switching transient voltages and also results in an undue amount of spurious electromagnetic radiation. Further, expensive and complex amplifying and shaping circuitry is required to process the signal induced in the pen tip coil.

Thus, there is presently an unmet need for an accurate but very low cost digitizer which requires minimal adjustment and maintenance for utilization in low cost applications such as replacement for light pens, trackballs, and joy sticks for CRT (cathode ray tube) cursor control, and which has a high signal-to-noise ratio.

Accordingly, it is an object of the invention to provide a low noise digitizing system which is substantially less expensive and more reliable than digitizing systems of the prior art.

It is another object of the invention to provide a digitizer having substantially higher signal-to-noise ratios than digitizers of the prior art.

It is yet another object of the invention to provide a digitizing system and method to produce a low noise sensing signal which can be conveniently amplified and analyzed to determine when grid conductors on opposite sides of the pen are sequentially scanned.

It is another object of the invention to reduce the amount of multiplexing circuitry required for a digitizer of the type having signals induced in a grid of conductors by a coil positioned above the grid.

SUMMARY OF THE INVENTION

Briefly described, and in accordance with one embodiment thereof, the invention provides a high signal-to-noise ratio digitizing system and method for converting a position of an instrument to an electrical signal representing a position of the instrument with respect to a grid of conductors. In one embodiment of the invention, the instrument is a pen having a coil disposed about a nose piece located immediately above the writing tip of the pen. The grid of conductors includes a group of parallel spaced conductors oriented in an X direction and a group of parallel spaced conductors oriented in a Y direction. The pen tip is moved along a worksheet disposed on a support surface containing the grid of conductors. An oscillator applies a signal of predetermined constant frequency and amplitude to the coil. The coil is inductively coupled to the conductors of the grid, thereby inducing signals in the conductors. In accordance with electromagnetic theory, the magnitude and phase of the signals induced in the respective grid conductors depend upon the location of the conductors with respect to the pen tip. The grid conductors in each group are sequentially scanned to sequentially couple the induced signals to a differential amplifier by means of multiplexing circuitry. The multiplexing circuitry selects the respective grid conductors in response to an address decoder. The X and Y groups of grid conductors are divided into subgroups. Each grid conductor is referred to as having a first end and a second end. In each group, the first ends of corresponding conductors of the respective subgroups are connected together and to a corresponding input of a top multiplexer. The second ends of the respective conductors of each of the respective subgroups are all coupled by means of isolation diodes to a corresponding common conductor connected to the anodes of all of the isolation diodes of that subgroup. The respective common conductors of the subgroup are respectively connected to corresponding inputs of a bottom multiplexer. The output of the top multiplexer for the X group is connected to the output of the bottom multiplexer for the Y group and is also coupled to one input of the differential amplifier. The output of the bottom multiplexer for the X groups is connected to the output of the top multiplexer for the Y group and is also coupled to the other input of the differential amplifier. The address decoder is driven by a scan counter. The scan counter is incremented by a signal produced by a divider circuit driven by the oscillator. A position counter is incremented in response to the oscillator as the X and Y groups of grid conductors are sequentially scanned. A phase sensitive detector responsive to the output of the amplifier produces a positive signal having a step-like envelope as grid conductors approaching one side of the pen tip are sequentially scanned. The phase sensitive detector also produces a negative signal having a step-like envelope as conductors on the opposite side of the pen tip are sequentially scanned in a direction away from the pen tip. The signal produced by the phase sensitive detector is filtered to produce a characteristic wave shape signal having a positive peak as the scanning approaches the pen tip. The filtered signal falls steeply across the zero axis to a negative peak as the scanning passes under the pen tip, and decreases as the scanning continues in a direction away from the pen tip. The filtered signal is differentiated and compared to a predetermined threshold level to produce a stop pulse. The stop pulse is utilized to disable the position counter. At this point, the contents of the position counter represent the location of the pen tip with respect to the Y group of grid conductors, and are loaded into an output register. The contents of the output register are then outputted to a utilization device. The scan counter and the position counter are reset, and the conductors of the Y group conductors are scanned in a similar manner to produce a digital position number representing the location of the pen tip with respect to the X group of conductors.

BRIEF DESCRIPTION OF THE DRAWINGS

FIG. 1 shows a block diagram of a digitizing system constructed according to the present invention.

FIGS. 3A–3C constitute a circuit schematic diagram of part of the embodiment of FIG. 1.

Referring now to FIG. 1, digitizing system 1 includes a work sheet support surface 3 and a controlled pen 5 positioned over support surface 3. Support surface 3 has a plurality of parallel spaced conductors oriented in the "X" (horizontal) direction and a plurality of parallel spaced conductors oriented in the "Y" (vertical) direction imbedded therein. The parallel grid wires are placed approximately 200 mills apart in the described embodiment of the invention. The position of pen 5 above support surface 3 can be controlled in a variety of ways known to those skilled in the art. The apparatus for controlling the position of pen 5 will not be discussed in detail herein. A marking surface, such as a paper sheet, is disposed on support surface 3 for being marked upon by pen 5. The purpose of digitizing system 1 is to provide a digital output which continuously represents the location of the tip of pen 5 with respect to a reference point of support surface 3.

Figure 2A:
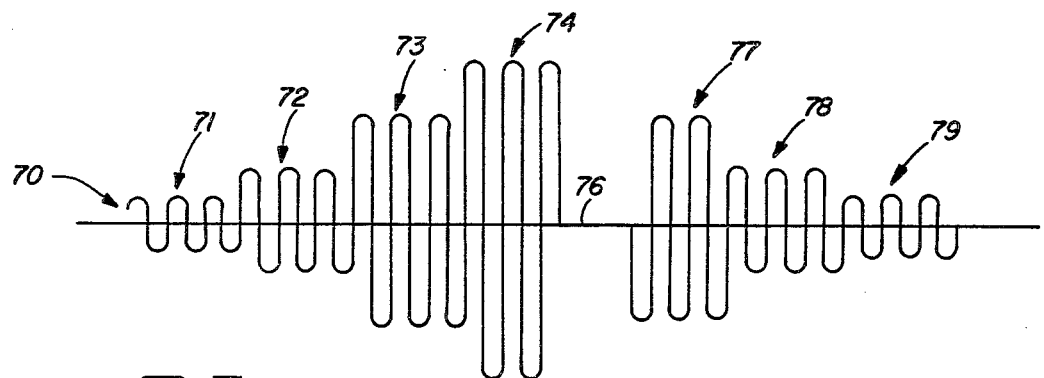
FIG. 2A shows a signal waveform produced by the preamplifier of FIG. 1.

Reference oscillator 10 produces a 96 kilohertz signal which is inputted via conductor 27 to filter and power amplifier circuit 12. Filter and power amplifier circuit 12 produces a twelve volt peak-to-peak 96 kilohertz signal which drives a coil located at the tip of pen 5, causing pen 5 to radiate a strong magnetic field. The details of the tip and coil associated with pen 5 are set forth in FIG. 5, discussed hereinafter. When the tip of pen 5 is positioned above support surface 3 and brought in contact with the marking sheet (not shown) supported by support surface 3, the magnetic field produced by the coil induces a 96 kilohertz alternating current voltage in each of the X and Y conductors imbedded immediately beneath support surface 3. The magnitude of the voltages induced in the grid conductors vary from nearly zero volts to a maximum of approximately several millovolts, depending upon the distance of the conductor from the tip of pen 5.

Figure 5:
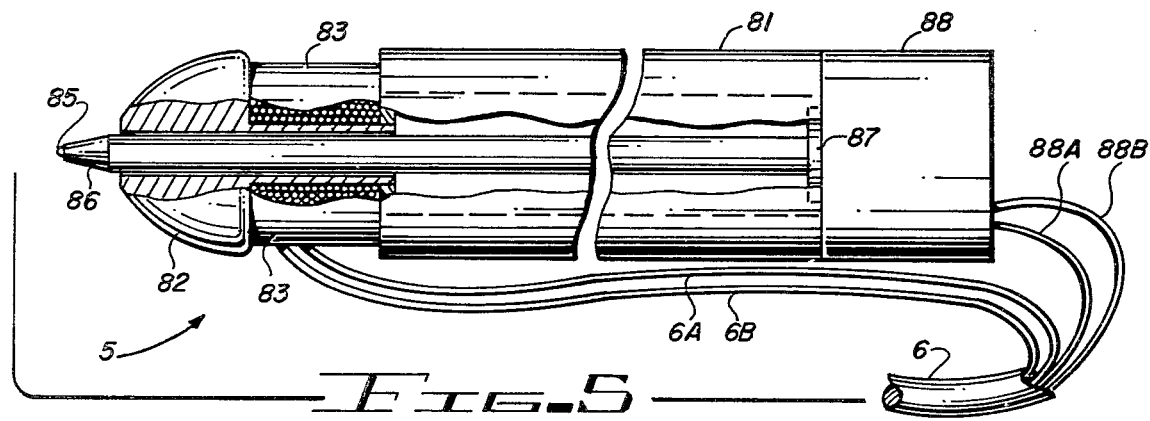
FIG. 5 is a sectional diagram illustrating the pen of the digitizing system of FIG. 1.

The detailed structure of pen 5 is shown in FIG. 5. Referring now to FIG. 5, pen 5 includes a plastic cartridge holder element 81 having a nose piece 82 attached thereto. A coil, having approximately sixty turns of number 32 wire, is wound about a neck of nose piece 82. Conductors 6A and 6B conduct a continuous AC current having a peak magnitude exceeding one ampere from filter and amplifier circuit 12. Conductors 6A and 6B extend along the side of plastic cartridge holder 81 to cable 6, wherein they are routed to the output terminals of filter and power amplifier circuit 12 of FIG. 1.

A ball point pen cartridge 86 has a writing ball point tip 85. The shaft of cartridge 86 extends through a central opening in noise piece 82 and plastic cartridge holder 81 to a pressure-sensitive actuator for a switch 88. When pen 5 is pressed against a work sheet supported by support surface 3 of FIG. 1, actuator 87 is depressed, closing switch 88, and sending a status signal via a pair of conductors generally designated by reference numerals 88A, 88B via cable 6 to status logic circuitry 58 of FIG. 1.

A threaded aluminum housing (not shown) is disposed about pen 5, leaving coil 83, nose piece 82, and writing tip 85 exposed during operation of the digitizing system of the present invention.

Referring again to FIG. 1, one end of each of the "X" conductors, designated by reference numeral 7, is connected to a common line; the other end of each of the X conductors 7 is connected to a respective input of analog switch array 16. Similarly, one end of each of Y conductors 8 is connected to a common conductor. The other end of each of the Y conductors is connected at a respective one of the inputs of analog switch array 16. Analog switching array 16 multiplexes the induced voltages on the X and Y grid conductors 7 and 8 onto output conductor 36 in a predetermined sequential order. The X grid conductors 7 are sequentially "scanned" across support surface 3 to sequentially couple the induced signals on the respective grid conductors to output 36 of analog switch array 16. Similarly, the Y grid conductors 8 are sequentially scanned across support surface 3 to sequentially couple the induced signals on the respective Y grid conductors to output 36A of analog switch array 16. Once an initial location of the tip of pen 5 is detected, subsequent scanning can be performed over a reduced area, say one inch square, of the grid of conductors to "keep up" with movement of pen 5 across the work sheet supported by support surface 3; the "data rate" of digitizing system 1 can thereby be increased.

Individual analog switches contained in analog switch array 16 are controlled in response to address signals produced on conductors 18, which are connected to outputs of address decoder 20. The binary inputs to address decoder 20 are received via address bus 22, which is driven by the outputs of scan counter 24. Scan counter 24 is incremented in response to a signal on output conductor 27 of oscillator 10. Normally, the above-described scanning operation is continuous. That is, as soon as analog switch array 16 scans all of the X conductors 7, it then scans all of the Y conductors 8 and then again scans X conductors 7. However, if it is desired to transmit the "position data" obtained by digitizing system 1 to a remote utilization system via a RS232 type communications link, then the scanning operation must be interrupted, so that new position data is obtained at a rate corresponding to the rate at which position data can be serially transmitted to the communications link.

The induced AC signals on X and Y conductors sequentially coupled to output 36A of analog switch array 16 are thus applied to one input of amplifier 38. As subsequently explained, amplifier 38 includes a differential amplifier having a pair of differential inputs and a pair of complementary outputs. The two outputs of amplifier 38 are connected to two respective inputs 40A and 40B of phase sensitive detector 42. Phase sensitive detector 42 has a synchronous control input connected to conductor 27 for alternately connecting output 44 to inputs 40A and 40B every half cycle of the signal on conductor 27, i.e., every half cycle of the signal driving the coil of pen 5. As subsequently explained, it can be seen that the control input of phase sensitive detector 42 is synchronized with, and is the same frequency as the output signal from amplifier 38. If the induced signal in the selected array conductor is in phase with oscillator 10, phase sensitive detector 42 produces a positive full wave rectified output of eight cycles before analog switch array 16 switches to the next grid conductor. The amplitude of the output of phase sensitive detector 42 is proportional to the amplitude of the induced signal in the grid conductor presently selected by analog switch array 16. If the induced signal is out of phase with oscillator 10, phase sensitive detector 42 produces a negative full wave rectified signal proportional in amplitude to the amplitude of the induced signal on the presently selected conductor.

The output of phase sensitive detector 42 is filtered by low pass filter 46, and is then differentiated by means of coupling capacitor 48 to produce an input signal for comparator 50. Comparator 50 produces a "stop pulse" on conductor 52, thereby indicating that the scanning of X grid conductors (or Y grid conductors) has located the tip of pen 5. The leading edge of the stop pulse is applied to an inhibit input of position counter gate 30, thereby stopping position counter 28 from being further incremented by a 480 kilohertz oscillator output signal on conductor 26. At this point in time, the digital number in position counter 28 represents the location of the tip of pen 5 with respect to the X grid conductors (or Y grid conductors) presently being scanned. It should be noted that position counter 28, when enabled, counts approximately 40 times from the beginning of scanning of the induced signal on one grid conductor to the beginning of scanning of the next grid conductor. A signal produced on conductor 65 by address decoder 20 then gates the contents of position counter 28 into output register 54. The contents of output register 54 are then loaded in parallel format into output buffer 56. Serial data logic 62 receives a clock signal produced by divider 60, which divides the signal on conductor 27 to produce a gating signal which controls the rate at which the contents of output register 54 can be loaded into shift register 64 and serially shifted out via output buffer 66 to a MODEM (not shown) for transmission via an RS232 communications link to a remote utilization device.

It should be noted that address decoder 20 decodes a number of states of bus 22 in order to initiate certain events, including resetting various flip flops and counters at the beginning of each scanning operation. It should also be noted that the signals on the conductors included in bus 18, which provide addresses to analog switch array 16, are directly generated by gated scan counter 24, as can be more clearly seen in FIG. 3B and FIG. 4. One of the other address decoder outputs is combined with other status information of whether the tip of pen 5 is in the "margin area" of the grid to determine whether to produce a signal on conductor 65 at the end of a scanning operation in order to enable the contents of position counter 28 to be loaded into output register 54.

Status logic circuitry 58 includes circuitry which detects whether scanning is being done in the "active" area of the grid of X and Y conductors. The status logic also includes circuitry which indicates whether data presently stored in the output buffers is valid. Another status signal indicates whether the data stored in the output buffers corresponds to location of the tip of pen 5 with respect to the X conductors of the Y conductors.

The approximate waveforms produced at the outputs of amplifier 38, phase sensitive detector 42, low pass filter 46, differenting capacitor 48, and comparator 50 as several grid conductors are sequentially scanned from one side of pen 5 to the opposite side thereof are shown in FIGS. 2A, 2B, 2C, 2D, and 2E, respectively. FIG. 2A shows waveform 70 produced at output 40A of amplifier 38. Reference numerals 71, 72, 73, and 74 represent the amplified signals induced in the four conductors scanned immediately before the location of pen 5 is reached. (It should be noted that although only three cycles are shown in FIG. 2A during each scanning step for each respective conductor, in practice, the respective internal analog switches of analog switch array 16 connect the respective X conductors (or Y conductors) to the inputs of amplifier 38 for approximately eight cycles in the presently implemented embodiment of the invention.)

Reference numeral 76 shows the amplified voltage on a grid conductor located almost immediately beneath the tip of pen 5; as shown in FIG. 2A, the induced voltage on that grid conductor is approximately zero.

Reference numerals 77, 78, and 79 in FIG. 2A designate the amplified induced signals in the next three grid conductors scanned by analog switch array 16 located beyond the tip of pen 5, in order of increasing distance away from the tip of pen 5. As previously explained, the waveform of FIG. 2A is applied to one of the inputs of phase sensitive detector 42.

Figure 2B:
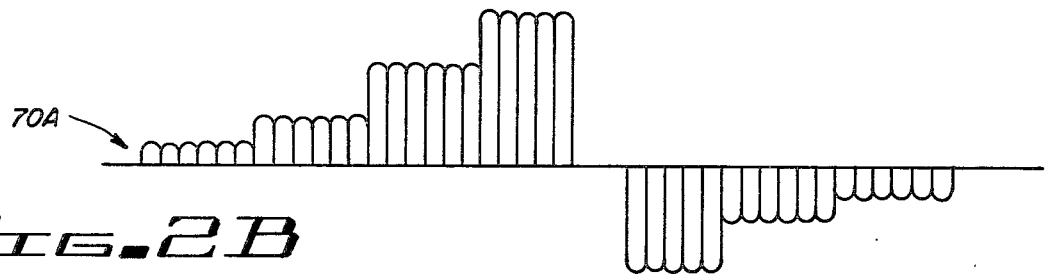
FIG. 2B shows a waveform produced by the phase sensitive detector of the digitizing system of FIG. 1.

The signal appearing on output 44 of phase sensitive detector 42 is shown in FIG. 2B, and is generally designated by reference numeral 70A. Since amplifier 38 includes a differential amplifier, both the waveform 70 of FIG. 2A and its complement are provided as inputs to phase sensitive detector 42. Phase sensitive detector 42, in response to the oscillator signal from conductor 27, alternately switches the output conductor 44 between alternate ones of waveform 70 and its complement, thereby producing waveform 70A. The waveform 70A is applied to the input of low pass filter 46, which in effect integrates waveform 70A of FIG. 2B thereby producing the characteristic waveform 70B of FIG. 2C. Waveform 70B gradually increases as the scanning of X conductors (or Y conductors) approaches the location of the tip of pen 5, reaching a peak 74B, falling sharply along slope 76B through the zero axis to a negative peak 77B, and then decreases in magnitude toward zero as analog switch array 16 continues to scan conductors located beyond the tip of pen 5.

Figure 2C:
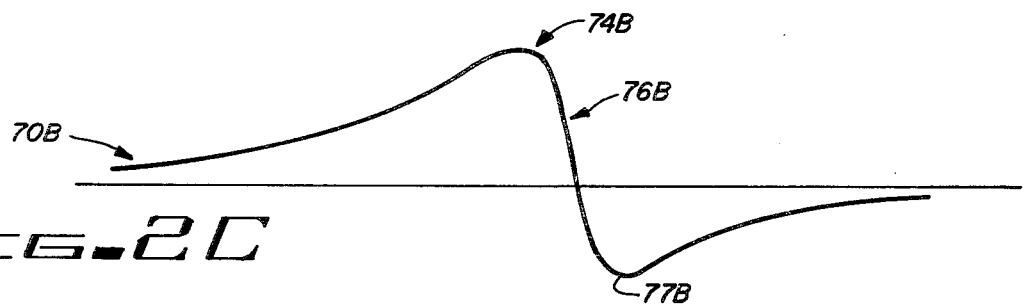
FIG. 2C shows a signal waveform produced at the output of the low pass filter of FIG. 1.
Figure 2D:
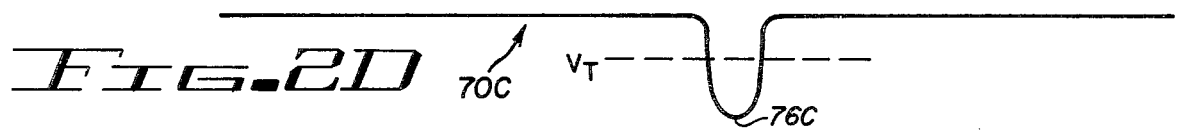
FIG. 2D shows the waveform of a signal applied to the input of the comparator of FIG. 1.
Figure 2E:
FIG. 2E is a signal waveform showing a stop pulse produced at the output of the comparator of FIG. 1.

Waveform 70B is applied to one terminal of differentiating capacitor 48, which in effect differentiates waveform 70B of FIG. 2C, thereby producing waveform 70C, which has a negative peak 76C, as shown in FIG. 2D. Waveform 70C is applied to the input of comparator 50, which compares the negative magnitude of peak 76C of waveform 70C to a negative threshold level $V_T$, and produces a negative pulse 76D of FIG. 2E on output conductor 52 if the negative magnitude of pulse 76C exceeds the magnitude of threshold level $V_T$.

It should be noted that the above described system automatically provides extrapolation between scanned adjacent conductors if the tip of pen 5 should be located midway between two adjacent grid conductors. The automatic extrapolation is achieved by virtue of the above described operation of low pass filter 46. As seen from FIG. 2C, low pass filter 46 approximately linearly integrates the output of phase sensitive detector 42 between peaks 74B and 77B. If, for example, the pen tip is located relatively closely to one grid conductor, the peak of waveform 70B corresponding to that conductor will be substantially higher than the opposite polarity peak corresponding to the next grid conductor located on the other side of the pen tip, and the steepest portion of the low pass filter output will be closest to first peak. The differentiated output of capacitor 48 then will occur sooner than if the pen tip were located closer to the second conductor. Consequently, the leading edge of the output pulse produced by comparator 50 will occur sooner, stopping position counter 28 sooner, and the smaller digital number in position counter 28 will reflect the fact that the pen tip was located closer to the first above-mentioned grid conductor. It is assumed that low pass filter 46 has a sufficiently long time constant that there are no cusps or dips in waveform 70C, regardless of whether the tip of pen 5 is located directly over a grid conductor or anywhere between two adjacent grid conductors.

Figure 4:
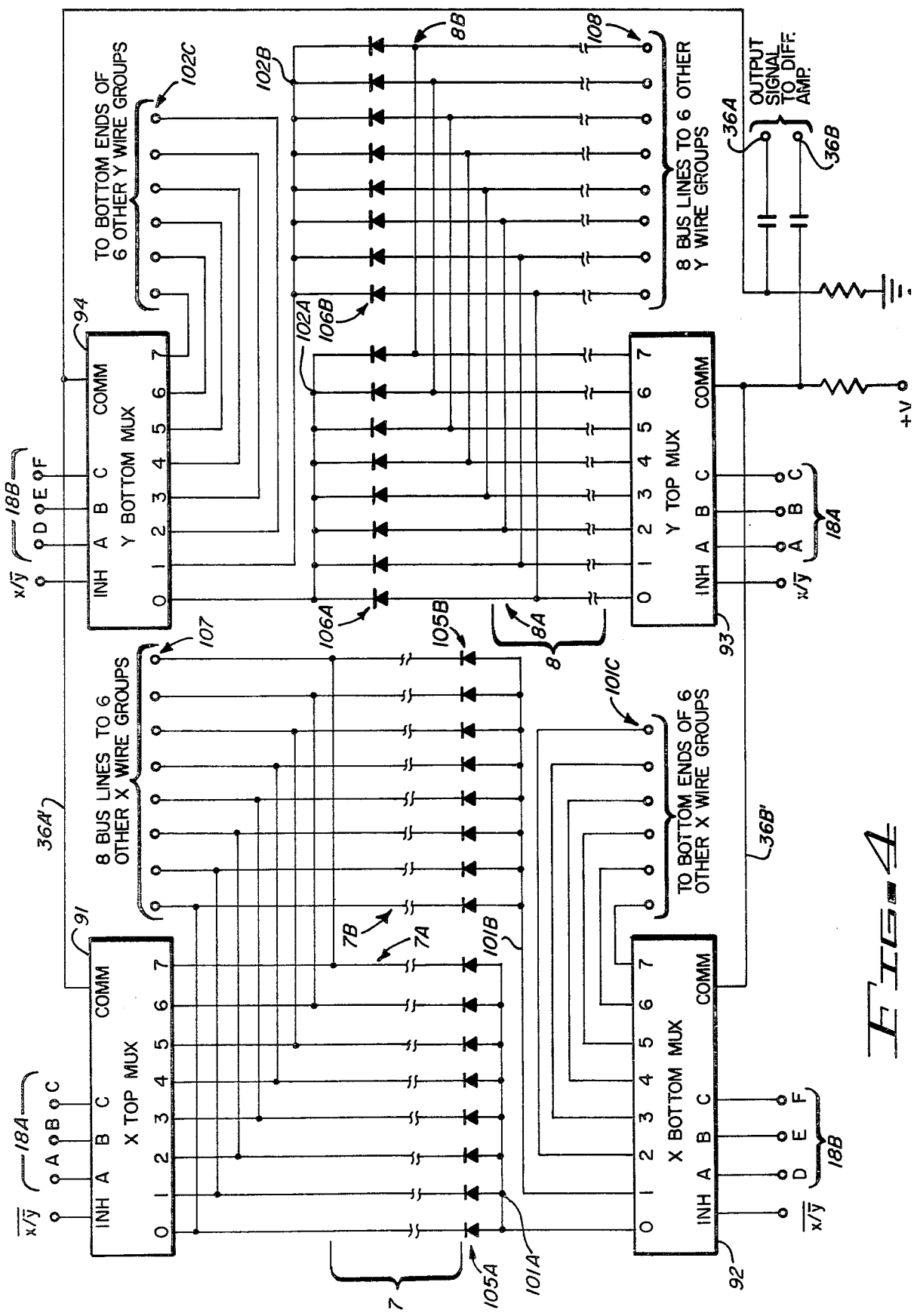
FIG. 4 is a schematic diagram of the analog switch array of the digitizing system of FIG. 1.

The analog switching circuitry 16 of FIG. 1 is shown in detail in FIG. 4. Referring now to FIG. 4, analog switching circuitry 16 includes four eight bit multiplexers, 91, 92, 93, and 94, which may be implemented by means of RCA (Radio Corporation of America) CD4051 integrated circuit eight bit multiplexers. Multiplexers 91 and 92 are utilized to operatively couple the X conductors 7 to conductors 36A′ and 36B′. Conductors 36A′ and 36B′ are terminated by resistors to ground and a positive supply voltage, respectively, and are capacitively coupled to conductors 36A and 36B, which are provided as inputs to a differential amplifier included in amplifier circuitry 38 of FIG. 1.

The presently implemented embodiment of the invention includes sixty-four X grid conductors, generally designated by reference numeral 7 in FIG. 4, and sixty-four Y grid conductors, generally designated by reference numeral 8 in FIG. 4. The sixty-four X conductors 7 are grouped into eight groups of eight X conductors each, and including first group 7A and second group 7B. The first through the eighth conductors of each group, such as 7A and 7B, are respectively connected to the first through the eighth conductors of a bus 107. The first through the eighth conductors of bus 107 are connected to the first through the eighth analog inputs of multiplexer 91.

The opposite ends of each of the conductors of each of the eight groups (such as 7A and 7B) are connected to the cathodes of a plurality of respective isolation diodes. The isolation diodes having their cathodes connected to the respective X conductors of group 7A are designated generally by reference numeral 105A. The isolation diodes having their respective cathodes connected to X conductors of group 7B are generally designated by reference numeral 105B. The remaining six groups of X conductors are similarly connected to cathodes of isolation diodes.

The anodes of all of isolation diodes 105A are connected together to conductor 101A. Similarly, the anodes of all the isolation diodes 105B are connected together to conductor 101B. Each of the isolation diodes of the remaining six groups have their anodes connected to corresponding ones of conductors 101C. Conductors 101A and 101B and the remaining six conductors designated by reference numeral 101C are connected to the eight respective outputs of multiplexer 92, which is identical to multiplexer 91. The A, B, and C inputs of multiplexer 92 are connected to three conductors 18B of address bus 18. Each of multiplexers 91 and 92 has an inhibit (INH) input having a signal ($\overline{X/Y}$). When this signal is at a logical "zero", the X grid conductors are being scanned by analog switch array 16.

The outputs of multiplexers 91 and 92 are connected to conductors 36A' and 36B', respectively. Conductor 36A' receives the induced signal of the presently selected X conductor via multiplexer 91, and capacitively couples that signal to conductor 36A, which is connected to one input of the differential amplifier of FIG. 3A, subsequently described. Similarly, conductor 36B' is coupled by means of multiplexer 92 to the common conductor (such as conductor 101A or 101B) of the eight conductor group (such as 7A or 7B, etc.) in which the presently selected X conductor is located. The signal in conductor 36B' is capacitively coupled to conductor 36B, which is connected to the other input of the amplifier of FIG. 3A. Thus, the induced signal in the presently selected X conductor appears across the differential inputs of the differential amplifier contained in amplifier circuitry 38.

The foregoing circuitry is included in the portion of analog switch array 16 which effects scanning of the X grid conductors 7; the multiplexing circuitry which controls scanning of the Y grid conductors 8 is similar. The sixty-four Y conductors are subdivided into eight conductor groups such as 8A and 8B. Ends of corresponding conductors of each such group are connected together by corresponding conductors of bus 108 and are also connected to corresponding ones of the eight inputs of multiplexer 93. Multiplexer 93 has its three address inputs connected to the same corresponding conductors (A, B, and C), designated by reference numeral 18A, as the address inputs of multiplexer 91 of the X scanning circuitry.

The opposite ends of each of the Y conductors 8 are connected to anodes of isolation diodes (such as 106A, 106B, etc.). The cathodes of the isolation diodes (such as 106A, 106B, etc.) associated with each group of Y conductors are connected to a respective common conductor (such as 102A, 102B, etc.) in a manner analogous to the corresponding connections in the X scanning circuitry. The common conductors 102A, 102B, etc. for each corresponding group of Y conductors are connected to a respective corresponding output of multiplexer 94. Multiplexer 94 has its address inputs connected to the same corresponding conductors 18B as multiplexer 92. The inhibit inputs of multiplexers 93 and 94 each have a signal $X/\overline{Y}$ applied thereto to enable scanning of the Y conductors. The output of multiplexer 94 is connected to conductor 36A', and the output of multiplexer 93 is connected to conductor 36B', previously described.

For convenience, multiplexer 91 is referred to as the "top multiplexer" of the X scanning circuitry, while multiplexer 92 is referred to as the "bottom multiplexer" thereof. Similarly, multiplexer 93 is referred to as the top multiplexer of the Y scanning circuitry, while multiplexer 94 is referred to as the bottom multiplexer thereof.

In early experiments, one end of each of the X grid conductors was electrically shorted to a common conductor to which a corresponding end of all of Y grid conductors were also shorted. This common conductor was applied to one input of the differential amplifier of amplifier circuit 38. Individual multiplexer inputs were connected to each of the respective opposite ends of the X and Y grid conductors. Thus, a differential input signal for the selected X (or Y) grid conductor was applied to the differential amplifier. However, a large amount of noise from various sources, including internal switching noise produced in the integrated circuit multiplexer devices, caused the digitizing system to have a relatively low signal-to-noise ratio, of the order of 4 to 1 or 5 to 1.

It was found that the signal-to-noise ratio could be increased by a factor of approximately fifteen by connecting the common bussed end of the X grid conductors to the common output of the multiplexer selecting the individual Y grid conductors and, correspondingly, connecting the common bussed end of the Y grid conductors to the output of the multiplexer selecting the individual X grid conductors, the X and Y multiplexer outputs being respectively connected to the two inputs of the differential amplifier of amplifier circuit 38. This technique is believed to cause much of the noise caused by internal multiplexer switching to become common mode noise which is inherently rejected by the differential amplifier in amplifier circuitry 38.

The above technique, although greatly improving the signal to noise ratio of the digitizer, still required a large number of multiplexer integrated circuits. The technique of subdividing the X grid conductors and Y grid conductors into eight bit subgroups each having their respective conductors selected by a single eight bit multiplexer, referred to as a top multiplexer, and utilizing another eight bit multiplexer, referred to as a bottom multiplexer, for selecting the one of the eight bit groups in which the desired grid conductor is contained, has been found to greatly reduce the total number of multiplexers required, especially for large grid arrays having large numbers of grid conductors oriented in each direction. The technique of connecting the isolation diodes, as explained above, prevents sneak path signals induced on unselected grid conductors from being coupled to the selected grid conductor in each eight bit subgroup.

Detailed circuitry utilized to implement the remaining circuitry of FIG. 1 is shown in FIGS. 3A–3C. Amplifier 38 is shown in FIG. 3A, and includes a Fairchild A733C integrated circuit differential amplifier 38' connected as shown. The package lead numbers for differential amplifier 38' are also indicated in FIG. 3A. Output conductors 36A and 36B from analog switch array 16 of FIG. 4 are coupled to the differential inputs of differential amplifier 38'. The biasing and filtering circuitry associated with differential amplifier 38' is conventional, and suitable values of the shown resistors and capacitors can readily be provided by those skilled in the art.

Phase sensitive detector 42 is implemented utilizing a CD4053 integrated circuit analog switch, designated by reference numeral 42' in FIG. 3A, and manufactured by RCA. The synchronization input signal applied to analog switch 42' is produced by transistor 100 in response to the 96 kilohertz signal produced on conductor 27 by oscillator 10, as shown in FIG. 3B.

Low pass filter 46 is implemented by means of a CA3130 integrated circuit operational amplifier 46', manufactured by RCA, connected to conventional biasing and filtering circuitry as shown.

Comparator 50 is implemented by means of a National Semiconductor LM311 integrated circuit comparator 50' having its output connected to conductor 52 to produce the counter "stop pulse" signal previously described.

Still referring to FIG. 3A, filter and power amplifier circuit 12 includes a conventional filter circuit 12A having its output connected to the input of a power amplifier circuit 12B. Power amplifier circuit 12B is implemented utilizing two National Semiconductor LM380 integrated circuit power amplifiers connected as shown to the primary winding of a transformer having its secondary winding connected to pen drive conductors 6A and 6B.

The scanning circuitry portion of FIG. 1, including oscillator 10, address decoder 20, position counter gate circuitry 30, position counter 28, and output register 54 are shown in FIGS. 3B and 3C. Referring to FIG. 3B, oscillator 10 is implemented by means of National Semiconductor LM375 integrated circuit oscillator 10A, connected to frequency determining components as shown. Output 27 of integrated circuit oscillator 10A is provided as an input to divide-by-ten counter 10B, which is implemented utilizing a National Semiconductor 74C90 integrated circuit, to produce an output signal on conductor 26.

Gated scan counter 24 is implemented by means of an AND gate 24A, which is implemented by a National Semiconductor 74C00 integrated circuit, and a ten bit binary counter 24B, which is implemented by means of model CD4040 integrated circuit, manufactured by RCA. Input 24C of AND gate 24A is connected to a scan gating flip flop, which temporarily halts the previously described scanning by analog switch array 16 when data is to be serially shifted out of digitizer 1 via shift register 64 and buffer 66; this is necessary to prevent the relatively high speed scanning operation from "overtaking" the relatively slow serial data shifting operation. The address outputs 22 of 10 bit counter 24B are provided as inputs to address decoder 20, which is implemented by means of three National Semiconductor 74C42 decoder integrated circuits 20A, 20B, and 20C, which are connected as shown to produce outputs 18, which are connected to the analog switch array inputs. Certain of the outputs of address decoder 20 are utilized to provide timing signals for timing circuitry which can be easily implemented by those skilled in the art, and which is not shown herein.

Position counter gate circuitry 30 includes two flip flops 30A and 30C, both implemented by means of National Semiconductor 74C74 flip flops and an AND gate 30B connected as shown. Position counter gate circuitry 30 produces an output 32, which serves as an input to position counter 28, shown in FIG. 3C. Position counter 28 is implemented by means of four four bit binary or BCD counters 28A, 28B, 28C, and 28D, each implemented by means of an RCA CD4029 integrated circuit. The outputs of four bits counters 28A, 28B, 28C, and 28D are connected to the inputs of flip flops 54A, 54B, and 54C, connected as shown and constituting output register 54. Flip flops 54A and 54B are implemented by means of National Semiconductor 74C174 hex flip flops. Flip flops 54C are implemented by means of a National Semiconductor 74C74 dual flip flop.

I claim:
1. In a digitizer including
   i. a first group of parallel conductors and a second group of parallel conductors oriented perpendicularly to the conductors of the first group, each of the conductors having a first end and a second end,
   ii. an instrument supporting a coil for inducing signals in the respective conductors,
   iii. a differential amplifier having first and second inputs,
   a low noise switching system for sequentially applying the induced signals between the first and second inputs, said low noise system comprising in combination:
   (a) a first common conductor coupled to said first ends of each of said conductors of said first group;
   (b) a second common conductor coupled to said first ends of each of said conductors of said second group;
   (c) first multiplexer means having an output coupled to said first input of said differential amplifier and a plurality of inputs coupled, respectively, to said second ends of each of said conductors of said first group for sequentially coupling said induced signals in said conductors of said first group to said output of said first multiplexer means.

2. The low noise switching system of claim 1 wherein said first common conductor and said second common conductor are directly connected to said first ends of said conductors of said first and second groups, respectively.

3. The low noise switching system of claim 1 wherein said first common conductor is coupled by means of a plurality of isolation diodes to said respective second ends of said conductors of said first group, each of said isolation diodes having its anode connected directly to said first common conductor and its cathode connected to a respective one of said first ends of said conductors of said first group.

4. The low noise switching system of claim 1 wherein said first and second multiplexer means each include addressable integrated circuit multiplexer devices having internal decoding.

5. In a digitizer including
   i. a first group of parallel conductors, each of said conductors having a first end and a second end,
   ii. an instrument including a coil driven by an electrical alternating current signal for inducing signals in the conductors of the first group, and
   iii. a differential amplifier having first and second inputs,
   a low noise switching system for sequentially applying the induced signals between the first and second inputs of the differential amplifier, said low noise switching system comprising in combination:
   (a) a plurality of subgroups of said first group, each of said subgroups including a plurality of said conductors;
   (b) first multiplexing means having a plurality of inputs connected, respectively, to the first ends of corresponding ones of said conductors of each of said subgroups for sequentially coupling the first ends of said respctive conductors to said first input of said differential amplifier;
   (c) a plurality of common conductors;
   (d) first means for coupling the second ends of all of said conductors of each of said respective subgroups to a respective one of said common conductors; and
   (e) second multiplexing means having a plurality of inputs connected, respectively, to respective ones of said common conductors for selectively coupling the second ends of the conductors in said respective subgroups to said second input of said differential amplifier.

6. The low noise switching system of claim 5 wherein said first means includes a plurality of isolation diodes in each subgroup, the anodes of each of said isolation diodes in each of said subgroups being connected to said respective common conductors, the cathodes of each of said isolation diodes in each of said respective subgroups being connected to the second ends of the respective conductors in that subgroup.

7. The low noise switching system of claim 5 wherein said digitizer further includes a second group of parallel conductors each having a first end and a second end, said second group of parallel conductors being oriented perpendicularly to said first group, said second group also being divided into a plurality of subgroups, said low noise switching system further including third multiplexing means having a plurality of inputs connected, respectively, to the first ends of corresponding ones of said conductors of each of said subgroups of said second group for sequentially coupling said first ends of said respective conductors in said subgroups of said second group to said second input of said differential amplifier, second means for coupling the second ends of all of said conductors and each of said respective subgroups of said second group to other respective ones of said common conductors, and fourth multiplexing means having a plurality of inputs connected, respectively, to said other ones of said common conductors for selectively coupling said second ends of said respective conductors of said second group of said first input of said differential amplifier.

* * * * *